US008463527B2

(12) United States Patent
Thorsen et al.

(10) Patent No.: US 8,463,527 B2
(45) Date of Patent: Jun. 11, 2013

(54) ELECTRONIC DIESEL ENGINE CONTROL DEVICE AND METHOD FOR AUTOMATIC IDLE-DOWN

(75) Inventors: Mitch Thorsen, Rhinelander, WI (US); Tim Caya, McFarland, WI (US)

(73) Assignee: Superior Diesel, Inc., Rhinelander, WI (US)

( * ) Notice: Subject to any disclaimer, the term of this patent is extended or adjusted under 35 U.S.C. 154(b) by 605 days.

(21) Appl. No.: 12/825,492

(22) Filed: Jun. 29, 2010

(65) Prior Publication Data

US 2010/0332107 A1 Dec. 30, 2010

Related U.S. Application Data

(60) Provisional application No. 61/221,132, filed on Jun. 29, 2009.

(51) Int. Cl.
*G06F 19/00* (2011.01)
*F02D 41/08* (2006.01)

(52) U.S. Cl.
USPC .................................... 701/103; 123/339.13

(58) Field of Classification Search
USPC .................. 701/103, 102, 101, 110, 115, 50; 123/339.11, 339.12, 339.13
See application file for complete search history.

(56) References Cited

U.S. PATENT DOCUMENTS

| | | | | |
|---|---|---|---|---|
| 4,354,466 | A | 10/1982 | Dudley et al. | |
| 4,556,942 | A * | 12/1985 | Russo et al. | 701/110 |
| 4,640,245 | A | 2/1987 | Matsuda et al. | |
| 4,779,591 | A | 10/1988 | Tordenmalm | |
| 5,353,762 | A | 10/1994 | Dykstra et al. | |
| 5,586,536 | A | 12/1996 | Seo et al. | |
| 6,092,018 | A * | 7/2000 | Puskorius et al. | 701/110 |
| 6,277,050 | B1 | 8/2001 | Nakagawa et al. | |
| 6,836,718 | B2 | 12/2004 | Hasfjord et al. | |
| 7,104,924 | B2 | 9/2006 | Hawkins | |
| 7,165,530 | B2 | 1/2007 | Jensen et al. | |
| 7,232,083 | B2 | 6/2007 | Stelter et al. | |
| 2008/0178839 | A1 * | 7/2008 | Oshima et al. | 123/339.13 |
| 2011/0297462 | A1 * | 12/2011 | Grajkowski et al. | 180/54.1 |

* cited by examiner

*Primary Examiner* — Hieu T Vo

(74) *Attorney, Agent, or Firm* — Joseph S. Heino; Patrick M. Bergin

(57) ABSTRACT

An electronic engine controller utilizes a controller network interface for direct communication between an electronic engine control unit associated with an engine and the controller to monitor and control the engine. The controller uses a microprocessor and custom programmable software to monitor and determine operational parameters as well as institute and send electronic commands to the electronic control unit in a pre-determined response operational framework. The controller monitors certain engine operational parameters when enabled. If the engine remains in an unloaded condition for an extended period of time, the controller automatically throttles the engine down to idle condition to save fuel. It does this by issuing commands to the electronic control unit which controls operational functions or parameters of the engine. The engine parameters and idle time are configurable, allowing the setup to be optimized for a particular method of operation, regardless of the specific application.

20 Claims, 3 Drawing Sheets

ELECTRONIC DIESEL ENGINE CONTROL DEVICE AND METHOD FOR AUTOMATIC IDLE-DOWN

This Application claims the benefit of U.S. Provisional Application No. 61/221,132, filed Jun. 29, 2009.

FIELD OF THE INVENTION

The present invention relates generally to electronic engine control devices and methods of controlling industrial diesel engines. More particularly, it relates to a device and method for monitoring diesel engine idle and then idling-down in accordance with a pre-programmable scheme.

BACKGROUND OF THE INVENTION

There are many diesel engine applications where the engine can potentially run at high RPM's for long periods of time without being loaded. Applications such as wood chippers, shredders, rock crushers and liquid waste skimmers are typical. One specific example of this is where a wood chipper is sitting and waiting for an operator to feed tree branches into the intake portion of the chipper. If the chipper runs at high RPM's during the course of operation and many instances of "down time" are experienced, the diesel engine of the chipper is needlessly consuming fuel and wasting the operator's money.

In the experience of these inventors, there is a clear need to provide a diesel engine controller that reduces overall fuel consumption by reducing fuel consumption between loads. There is also a need to provide such a controller that is pre-programmable and easy to use in the field.

SUMMARY OF THE INVENTION

An electronic engine controller in accordance with the present invention utilizes a controller network interface for direct bi-directional communication between an electronic engine control unit that is associated with an engine and the electronic engine controller utilizing the CAN bus J1939 protocol to monitor and control the engine directly. The electronic engine controller uses a microprocessor and custom programmable software to monitor and determine operational parameters as well as institute and send electronic commands to the electronic control unit in a pre-determined response operational framework, or pre-programmed scheme. When the controller is enabled, it monitors certain engine operational parameters. In the controller of the present invention, if the engine remains in an unloaded condition for an extended period of time, the controller automatically throttles the engine down to idle condition to save fuel. It does this by issuing commands to the electronic control unit which controls operational functions or parameters of the engine. The engine parameters and idle time are configurable, allowing the setup to be optimized for a particular method of operation, regardless of the specific application that the diesel engine is used for.

The foregoing and other features of the device and method of the present invention will be apparent from the detailed description that follows.

DETAILED DESCRIPTION OF THE INVENTION

Figure 1:
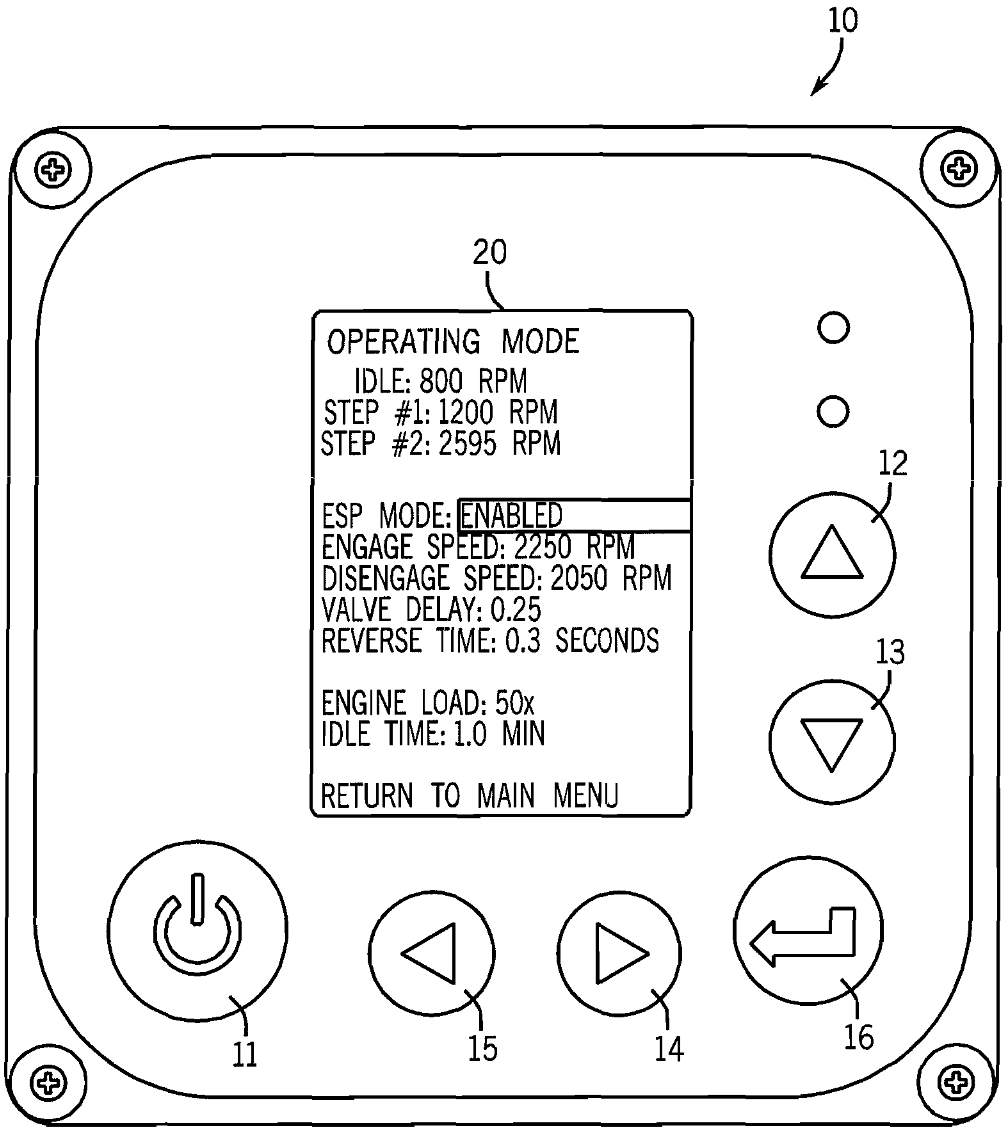
FIG. 1 is a front elevational view of the user interface of the controller that is constructed and programmed in accordance with the present invention and showing a first screen display.
Figure 2:
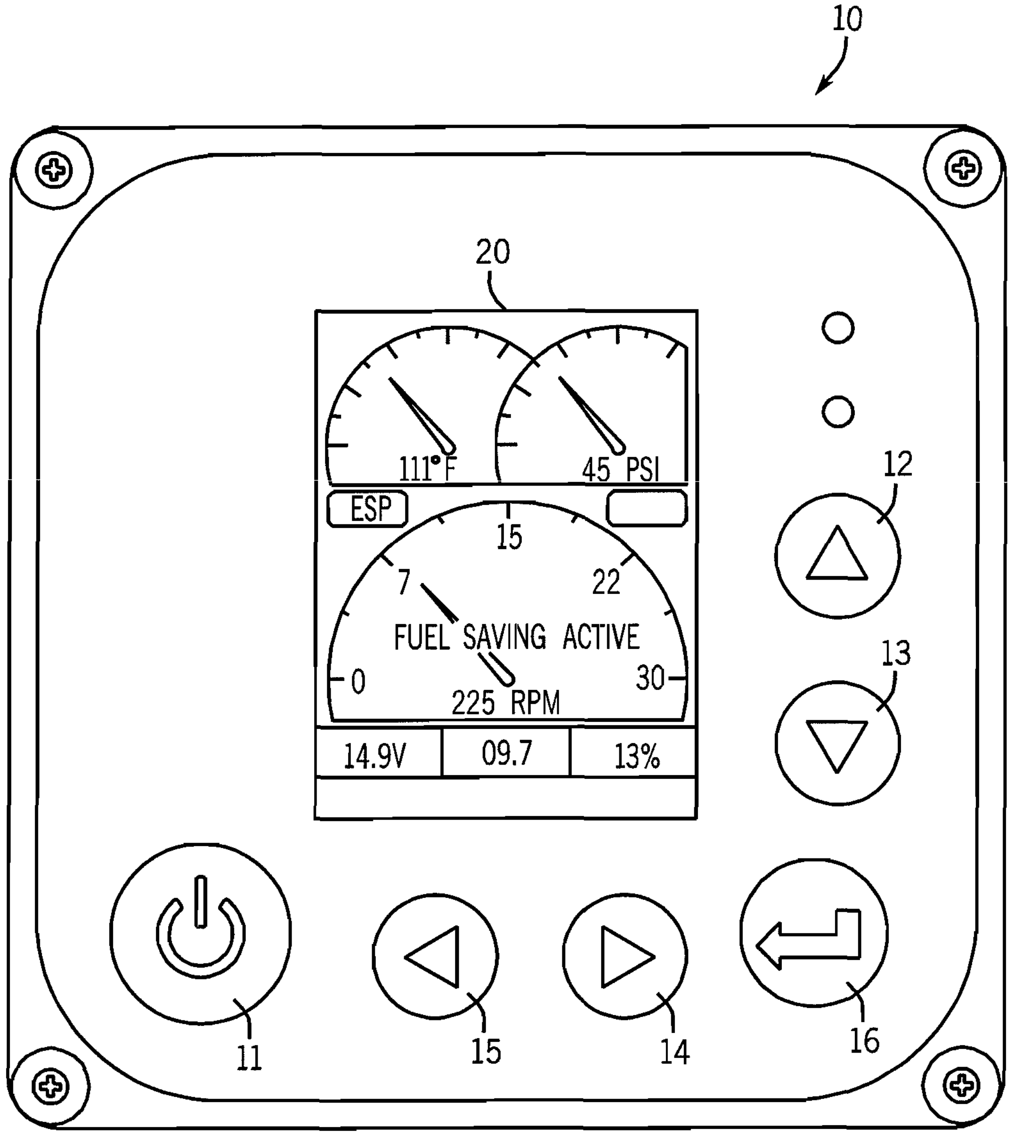
FIG. 2 is a view similar to that shown in FIG. 1, but showing a second screen display.
Figure 3:
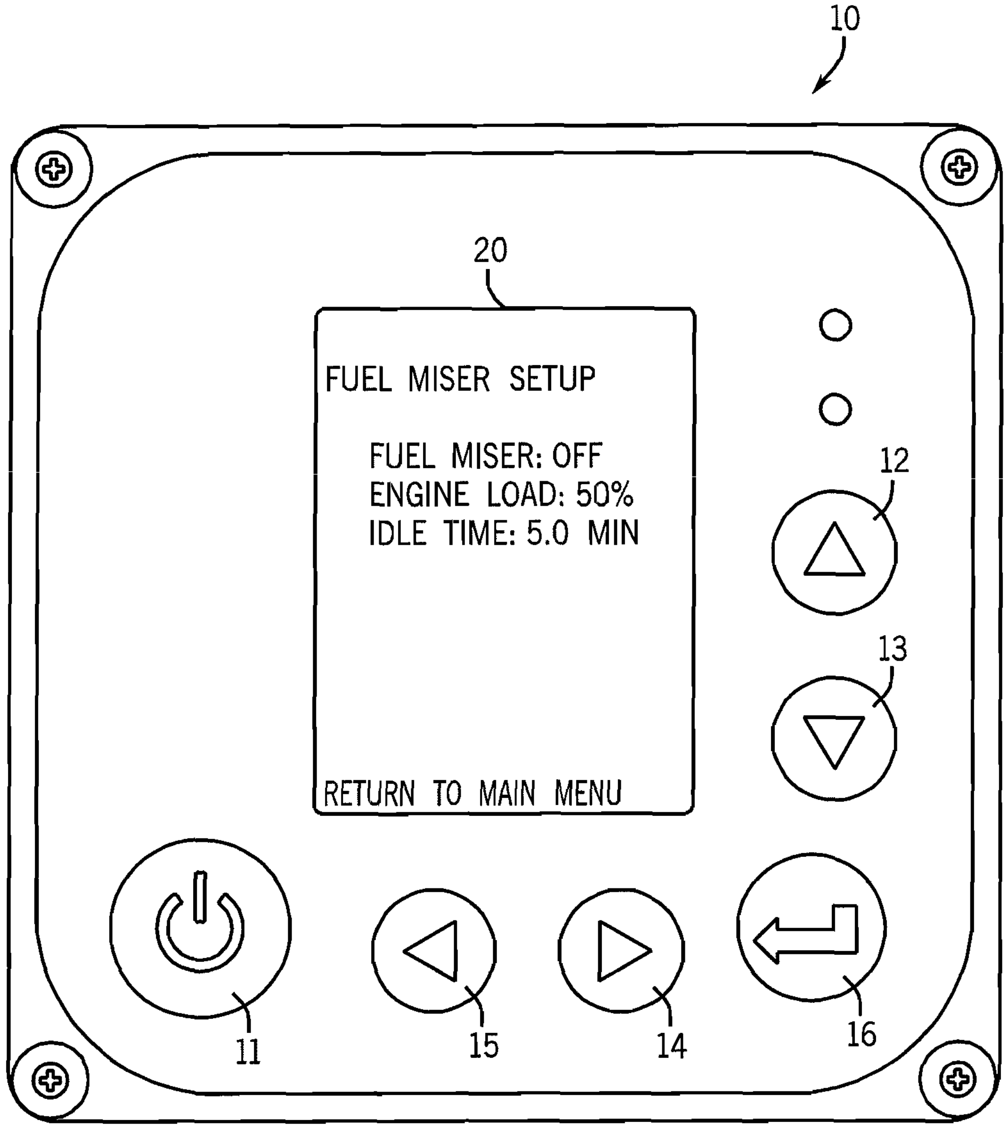
FIG. 3 is another view similar to that shown in FIG. 1, but showing a third screen display.

Referring now to the drawings in detail, wherein like-numbered elements refer to like elements throughout, FIGS. 1-3 illustrate the user interface of a preferred embodiment of a device that is constructed in accordance with the present invention, the device and its interface being designated generally, and collectively, by the numeral 10, and referenced herein as "the device" or "the controller." The device 10 uses a microprocessor (not shown) and custom software to read engine performance and operation information and to issue commands to control those operational functions. It is to be understood that the microprocessor comprises a storage component, which is well known in the art of information processing. The display is provided to communicate the engine's operational information to a user and allows the user to select and to input command parameters to control engine operational functions.

As a preliminary matter, it is to be noted that the device 10 of the present invention is made functionally possible by means of a Controller Area Network (CAN) system. A CAN system, or simply "CAN," is a serial bus system especially suited for networking "intelligent" devices as well as sensors and actuators within a system or sub-system. CAN comprises three layers, the physical layer, the data link layer and the application layer. CAN is unusual in that the network entities, or "nodes," are not given specific addresses. When a "message" or data is transmitted via CAN, no specific receiving stations are addressed. Rather, the content of the message (e.g. engine speed, engine temperature, among others) is designated by an "identifier" that is unique throughout the network. Further, the identifier defines the content of the message as well as the priority of the message.

As an aside, it should be mentioned that the CAN bus standard was pioneered by the automotive industry. It is now used in a wide variety of industrial equipment markets. It is to be understood, however, that the controller 10 of the present invention is not limited to any particular market, application, equipment or industry.

J1939 is the automotive CAN standard developed by the Society of Automotive Engineers (SAE). J1939 is the application layer that uses a twenty-nine (29) bit identifier. It also uses a bi-directional peer-to-peer protocol where most messages are "broadcasted" versus "directed" to individual nodes. In J1939, each CAN node is referred to as an electronic control unit (ECU) and every ECU has a node address. A CAN message consists of the following components:

- Priority, this 3-bit field defining on which page (0 or 1) the message is defined in the J1939 specification (where page 0 contains the messages that are presently defined whereas page 1 is for future expansion);
- Data Length, which is the number of data bytes in the message;
- Data Page, this 1-bit field defining on which data page (0 or 1) the message is defined in the J1939 specification (again, where page 0 contains the messages that are presently defined whereas page 1 is for future expansion);
- Protocol Data Unit (PDU) Format, this 8-bit field determining the format of the message and is one of the fields that determines the Parameter Group Number (or, PGN, as defined below) of the message (where a value between 0 and 239 defines a PDU 1 Format message and a value between 240 and 255 defines a PDU 2 Format message—again, these messages are not sent to a specific address, but are "broadcast" to the entire network); and PDU Specific, where the 8-bit field is either the Destination Address (PDU 1 Format) or the Group Extension (PDU 2 Format); also, most messages are intended to be broadcast messages, or PDU 2 Format, where the message is not sent to a particular address (the J1939 specification defines PDU Format and PDU Specific values for many messages by specifying the message Parameter Group Number (or, PGN, as defined below)).

Finally, data transferred on the CAN bus is defined by a Parameter Group (PG). A PG defines where the data is located in the CAN data frame, priority and transmission repetition rate. PGs are identified with Parameter Group Numbers (PGNs). Parameters are grouped according to some similar characteristics into PGs and are expressed by its PGN. The J1939 specification defines allowable messages by their PGN which is a 3-byte value that uniquely defines the message purpose. This is the number used in J1939 to access the data about a particular parameter or a set of parameters. In short, each PG is described with a name and then the following information:

Transmission repetition rate (a time interval or on request);
Data length (bytes);
Data page (0 or 1, and has to do with the PGN);
PDU Format (0 to 255, and has to do with the PGN);
PDU Specific (depends on PDU Format); and
Default Priority (value between 0 and 7 where 0 is the highest priority).

As discussed earlier, most of the internal messages sent using J1939 are sent as "broadcasts" without a specific destination address and broadcasts are bi-directional. The ECU Name allows the ECU to claim an address using that Name. The Name is a 64 bit (8 bytes) long number that gives every ECU a unique identity. The Name does two things. First, it provides a description of an ECU, including function. Second, it serves as a numerical value that can be used for "arbitration" when claiming an address. When arbitration for an address is performed, the Name is treated as an 8 byte numerical value where the lower the value, the higher the priority.

The device and method of the present invention monitors the following parameter: Engine % Load at Current Speed (F003)(SPN92)

The "live data" for this configuration is as follows:
PGN 61443 Electronic Engine Controller 2—EEC2
Transmission Repetition Rate: 50 ms
Data Length: 8
Data Page: 0
PDU Format: 240
PDU Specific: 3 PGN Supporting Information:
Default Priority: 3
Parameter Group Number: 61443 (0xF003)

| Start Position | Length | Parameter Name | SPN |
|---|---|---|---|
| 1.1 | 2 bits | Accelerator Pedal 1 Low Idle Switch | 558 |
| 1.3 | 2 bits | Accelerator Pedal Kickdown Switch | 559 |
| 1.5 | 2 bits | Road Speed Limit Status | 1437 |
| 1.7 | 2 bits | Accelerator Pedal 2 Low Idle Switch | 2970 |
| 2 | 1 bit | Accelerator Pedal Position 1 | 91 |
| 3 | 1 bit | Engine Percent Load at Current Speed | 92 |
| 4 | 1 bit | Remote Accelerator Pedal Position | 974 |

-continued

| Start Position | Length | Parameter Name | SPN |
|---|---|---|---|
| 5 | 1 bit | Accelerator Pedal Position 2 | 29 |
| 6.1 | 2 bits | Vehicle Acceleration Rate Limit Status | 2979 |

The application of this live data to a specific piece of equipment will be discussed later in this detailed description, and following a description of the preferred embodiment of the controller 10 and its display capabilities.

Referring now back to the drawings, the controller 10 constructed in accordance with the present invention is illustrated. The diesel engine controller used in the preferred embodiment is the Model H30 controller manufactured by Houston Street Technologies. Those skilled in the art will recognize, however, that the controller 10 of the present invention can be constructed in numerous ways. For industrial environments, the controller 10 is protected by an industrial housing (not shown). As used in this Specification, "industrial environments" includes application of a heavy duty vehicle or piece of equipment in the mining, earthmoving, forestry, construction and transportation industries, all generally "off-highway" diesel engine applications. Later in this detailed description, one specific application will be presented for purposes of enablement, but the present invention is not limited to that specific application as was stated previously.

FIGS. 1-3 show that the preferred embodiment of the controller 10 of the present invention comprises a display 20 and a plurality of tactile push buttons. The display 20 displays user-defined operating parameters on three analog gauge faces as well as scrolling text for a total of six parameters in addition to any active fault codes being broadcast by the engine ECU.

The tactile push buttons include a power button 11, an "UP" button 12, a "DOWN" button 13, a "RIGHT" button 14, a "LEFT" button 15 and an "ENTER" button 16. When used in the controller 10 of the present invention, the UP button 12 can be used to increase RPM or to scroll menu lists. The DOWN button 13 can be used to decrease RPM or to scroll menu lists. The RIGHT button 14 is used to increase parameter values and the LEFT button 15 is used to decrease parameter values. The ENTER button 16 can be used to access the "MAIN MENU" and to select a highlighted menu item.

The POWER button 11 is used to regulate power to the controller 10 and stop the engine from running. The engine (not shown) can only be started when the controller 10 is powered and is displaying the "Operation Screen." The engine can be shut down by pressing the power button when the engine is running.

When the POWER button 11 is pressed, the controller 10 will display a splash screen showing a company logo and controller information. After the splash screen has timed out, and if a "START UP SECURITY" is not enabled, the Operation Screen will be displayed. If Start Up Security is enabled, a PIN will be required to access the functionality of the controller 10. The Main Menu is accessed by pressing and releasing the ENTER button 16 while the user is at the Operation Screen. All other sub menus can be accessed from the Main Menu.

When the engine is running and the controller 10 is displaying the Operation Screen, the UP and DOWN buttons 12, 13 will increase and decrease the engine speed, respectively. The manner in which the speed increases or decreases depends on the then-current "Operation Mode," which may be "Manual Ramp," "Manual Step" or "Auto Ramp." The idle down functionality of the controller 10 will operate irrespective of the Operation Mode selected by the user.

When in the Manual Step mode, the engine will operate within a range of low and high RPM values, increasing and decreasing engine speed in set increments. A maximum of ten steps can be used to quickly, or slowly, increase or decrease engine speed with each press of the UP and DOWN buttons 12, 13, respectively. To access the Manual Step setup screen, the user presses the ENTER button 16 while at the Operation Screen to access the Main Menu. The user then uses the UP and DOWN buttons 12, 13 to highlight "OPERATING MODE" and then presses ENTER 16. Using the RIGHT and LEFT buttons 14, 15, the user then changes the Operating Mode to "MANUAL STEP." Finally, the user uses the UP and DOWN buttons 12, 13 to highlight "MANUAL STEP SETUP" and presses ENTER 16.

The "idle down" functionality is used in conjunction with the Manual Step Operating mode to save fuel by dropping the engine speed to idle when the engine is not being "worked." The definition of "worked" is defined by the settings in a "FUEL MISER" setup screen, "FUEL MISER" being an unregistered trademark of Houston Street Technologies. One setting might be, for example, where the engine load is less than fifty percent (50%) for five (5) continuous minutes. With such a setting, if the engine is at a speed higher than idle and the engine load is less than fifty percent (50%) for five (5) continuous minutes, the engine will drop to idle. Thereafter, the engine speed is increased back to operating speed by either pressing the UP button 12 or alternatively using a switch to ground that is connected to one of the controller's digital inputs (not shown).

The "FUEL MISER SETUP" screen, as shown in FIG. 3, will display the words "FUEL MISER" which is to turn the feature on or off, with "off" being the default. The screen will also display the words "ENGINE LOAD," which is the engine load percent minimum that the engine can operate at to avoid dropping to idle, and the words "IDLE TIME," which is the length of time that the engine can operate at or below the engine load limit before dropping to idle. Here again, the UP and DOWN buttons 12, 13 are used to scroll the screen. The RIGHT and LEFT buttons 14, 15 are used to increase or decrease the highlighted parameter, respectively. The ENTER button 16 is used to return to the Main Menu.

In accordance with the foregoing, the present invention provides an electronic engine controller that utilizes a controller network interface for direct bi-directional communication between an electronic engine control unit and the electronic engine controller utilizing the CAN bus J1939 protocol to monitor and control the engine directly. The electronic engine controller uses programmable software to determine operational parameters and institute electronic commands to the electronic control unit in a pre-determined response operational framework. When the controller is enabled, it monitors certain engine operational parameters. In the controller of the present invention, if the engine remains in an unloaded condition for a pre-programmed period of time, the controller automatically throttles the engine down to idle condition to save fuel. The engine parameters and idle time are configurable, allowing the setup to be optimized for a particular method of operation, regardless of the specific application that the diesel engine is used for.

The details of the invention having been disclosed in accordance with the foregoing, we claim:

1. An electronic control device for monitoring the idle of a diesel engine and idling-down the diesel engine comprising:

an electronic control unit (ECU) associated with the diesel engine;

a control area network (CAN) that establishes electronic communication with the ECU;

a user interface, the user interface comprising a housing; a microprocessor; programmable software to determine a plurality of operational parameters of the diesel engine and to institute electronic commands to the ECU via the CAN; a visual display; and a plurality of input means;

wherein the ECU communicates with the user interface via the CAN in conformance with the J1939 protocol; and wherein the diesel engine idle is monitored and idled-down in accordance with a pre-programmable scheme.

2. The electronic control device of claim 1 wherein the plurality of operational parameters includes the parameter of engine percentage load at current speed and wherein said parameter is monitored.

3. The electronic control device of claim 2 wherein the plurality of input means comprises a plurality of tactile push buttons.

4. The electronic control device of claim 3 wherein the plurality of tactile push buttons comprises a power button, an up button, a down button, a right button, a left button and an enter button.

5. The electronic control device of claim 4 wherein the up button is used to increase engine RPM; the down button is used to decrease engine RPM; the right button is used to increase parameter values; the left button is used to decrease parameter values; the enter button is used to access a main menu on the display; and the power button is used to regulate power to the controller and stop the engine from running.

6. The electronic control device of claim 5 wherein the display displays a main menu having a "fuel miser setup" screen option.

7. The electronic control device of claim 6 wherein the screen option displays the words "engine load," which is a parameter defined as the engine load percent minimum that the engine can operate at to avoid dropping to idle, and the words "idle time," which is a parameter defined as the length of time that the engine can operate at or below the engine load limit before dropping to idle.

8. The electronic control device of claim 7 wherein the right and left buttons can be used to increase or decrease, respectively, the parameters of "engine load" and "idle time."

9. A method for automatic idle-down of a diesel engine comprising the steps of:

providing an electronic control unit (ECU) associated with the diesel engine;

providing a control area network (CAN) that establishes electronic communication with the ECU in conformance with the J1939 protocol;

providing a user interface, the user interface comprising a housing; a microprocessor; programmable software to determine a plurality of operational parameters of the diesel engine and to institute electronic commands to the ECU via the CAN; a visual display; and a plurality of input means;

monitoring the idle of the diesel engine; and idling-down the diesel engine in accordance with a pre-programmed scheme.

10. The method of claim 9 wherein the plurality of operational parameters includes the parameter of engine percentage load at current speed and wherein said engine monitoring step comprises monitoring the parameter of engine percentage load at current speed.

11. The method of claim 10 wherein the plurality of input means comprises a plurality of tactile push buttons.

12. The method of claim 11 wherein the plurality of tactile push buttons comprises a power button, an up button, a down button, a right button, a left button and an enter button.

13. The method of claim 12 wherein the up button is used to increase engine RPM; the down button is used to decrease engine RPM; the right button is used to increase parameter values; the left button is used to decrease parameter values; the enter button is used to access a main menu on the display; and the power button is used to regulate power to the controller and stop the engine from running.

14. The method of claim 13 further comprising the step of displaying a "fuel miser setup" screen option on the user interface display.

15. The method of claim 14 further comprising the steps of displaying the words "engine load," which is a parameter defined as the engine load percent minimum that the engine can operate at to avoid dropping to idle, on the user interface display screen and displaying the words "idle time," which is a parameter defined as the length of time that the engine can operate at or below the engine load limit before dropping to idle, on the user interface display screen.

16. A method for monitoring the idle of a diesel engine and idling-down the diesel engine via a control area network (CAN) data link, the method comprising the steps of:

providing a user interface that comprises programmable software to determine operational parameters of the diesel engine and to institute electronic commands to an electronic control unit associated with the engine in a pre-determined response operational framework;

providing a user interface display;

monitoring the idle of the diesel engine; and throttling down the diesel engine when the control device detects idling of the engine for an extended period of time.

17. The method of claim 16 further comprising the step of allowing the operational parameters of the diesel engine and the idle time to be configurable wherein one operational parameter comprises the parameter of engine percentage load at current speed and wherein said idle monitoring step comprises monitoring the parameter of engine percentage load at current speed.

18. The method of claim 17 further comprising the steps of providing a plurality of tactile push buttons, the plurality of tactile push buttons comprising a power button, an up button, a down button, a right button, a left button and an enter button; using the up button to increase engine RPM; using the down button to decrease engine RPM; using the right button to increase parameter values; using the left button to decrease parameter values; using the enter button to access a main menu on the user interface display; and using the power button to regulate power to the controller and stop the engine from running.

19. The method of claim 18 further comprising the steps of displaying a "fuel miser setup" screen option on the user interface display; displaying the words "engine load," which is a parameter defined as the engine load percent minimum that the engine can operate at to avoid dropping to idle, on the user interface display screen; and displaying the words "idle time," which is a parameter defined as the length of time that the engine can operate at or below the engine load limit before dropping to idle, on the user interface display screen.

20. The method of claim 19 wherein the data link conforms with the J1939 protocol.

* * * * *